June 1, 1965

D. C. FREEMAN, JR., ETAL 3,186,225

MOISTURE SENSING METHOD AND APPARATUS

Filed July 29, 1959

INVENTORS
DONALD C. FREEMAN, JR.
DENNIS N. STAMIRES

BY
ATTORNEY 3,186,225
MOISTURE SENSING METHOD AND APPARATUS
Donald C. Freeman, Jr., Durham, N.C., and Dennis N. Stamires, Buffalo, N.Y., assignors to Union Carbide Corporation, a corporation of New York
Filed July 29, 1959, Ser. No. 830,349
9 Claims. (Cl. 73—336.5)

This invention relates to a method of and apparatus for measuring the moisture content of a fluid system. More particularly it relates to a moisture sensing element constructed of crystalline zeolites for use in such a method and apparatus.

An electric hygrometer, an instrument or apparatus for measuring the degree of moisture in gaseous atmosphere, normally comprises an electric circuit with a current measuring device, a fixed voltage source, and a sensing element one of whose physical characteristics is affected by the moisture content thereof. The change of physical characteristics most frequently made use of in such an electric hygrometer is the resistance, either surface or volume of a sensing element. An electric hygrometer, therefore, may be defined as an instrument for determining the moisture content of a fluid by the measurement of the electrical resistance of a hygroscopic material with change in humidity, or water content of the fluid. While other methods of measuring the moisture content of a gas including various electrical devices are known, the term electric hygrometer as used herein is intended to mean an instrument which measures the electrical resistance of a material as an indication of the water vapor partial pressure or relative humidity or water content of fluids in contact with the material.

The term fluid system as used herein is intended to include air and other gases containing water vapor and also liquids containing a small amount of water.

Many materials sorb and desorb water vapor as the ambient relative humidity increases or decreases. Materials which display a humidity-dependent change in resistance can be utilized as humidity sensors. However, for a sensor to be of practical use, it should have preferably a reversible and reproducible humidity-resistance characteristic.

The materials used as the sensing elements in such electric hygrometers are classified according to their method of operation or manner in which the water is sorbed by the sensor. One type of sensor relies upon the varying conductivity of an electrolytic solution as the concentration of the solution varies with relative humidity. Other types include material whose surface resistivity varies with humidity, materials whose volume resistivity varies with humidity and materials whose dimensions and resistance vary with humidity. While all of these sensing elements will give comparatively accurate indications of relative humidity or water vapor partial pressures when properly calibrated, most of them suffer from various limitations which restrict their use. Among these limitations are a lengthy time to reach equilibration, criticality of physical adjustments, too bulky to be readily portable, and lengthy time to desorb to a lower equilibrium of water vapor partial pressure from a higher state.

Of these sensors the type relying on volume resistivity has the inherent advantage of being easy to move about since there are no liquid electrolytes to spill or splash and the electrodes may be fixedly attached to the element. However, prior sensors of this type were severely limited due to the aforementioned difficulty in attaining absorption equilibrium within a practical time.

It is accordingly an object of the present invention to provide an improved method and apparatus for measuring the moisture content of a fluid system.

It is a further object to provide such a method and apparatus which includes an electric hygrometer utilizing changes in volume resistivity of a sensing element corresponding to changes in the water content of a fluid as the measurable parameter.

It is a further object to provide such a hygrometer which has a high degree of sensitivity and requires a short period for reaching equilibrium.

It is a still further object to construct such a hygrometer employing a crystalline zeolite.

Other objects and advantages will be apparent from the following description and drawings in which.

Figure 1:
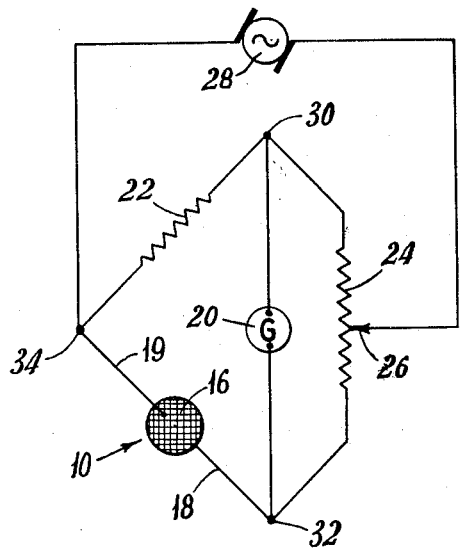
FIG. 1 is a schematic electrical diagram of a preferred embodiment of an electric hygrometer incorporating the novel moisture sensing element of the instant invention.

The objects of this invention are accomplished, in general, by an electric hygrometer which comprises a crystalline zeolitic sensing element whose volume resistivity varies with changes in the water content of a fluid system and means for measuring the instantaneous resistance of the element whereby the relative humidity may be determined.

The measuring means preferably employed comprises an A.C. bridge circuit wherein the zeolite sensing element comprises one of the legs.

Referring now to the drawings, the invention will be described in greater detail.

Figure 3:
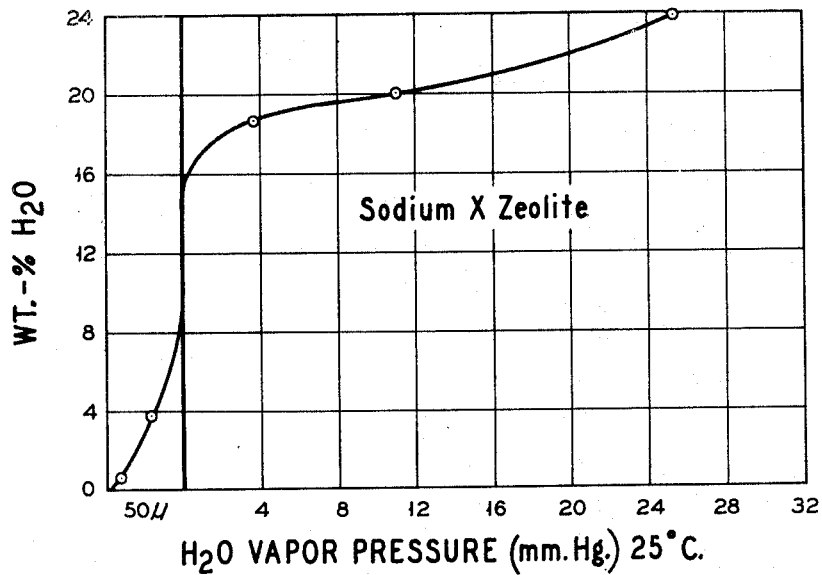
FIGS. 3–7 are graphical representations of different water adsorption characteristics of exemplary crystalline zeolites.
Figure 4:
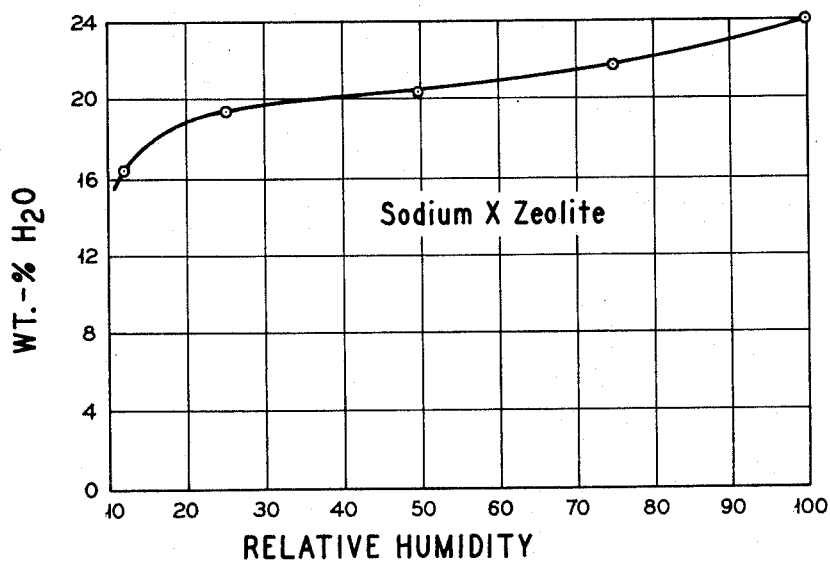

It is found that the amount of water contained by a crystalline zeolite is dependent on the water content of the fluid system surrounding the zeolite. FIG. 3 shows a typical adsorption isotherm for water on a pellet of sodium X zeolite. FIG. 4 shows the weight percent loading of water in a sodium X zeolite pellet versus relative humidity.

Figure 5:
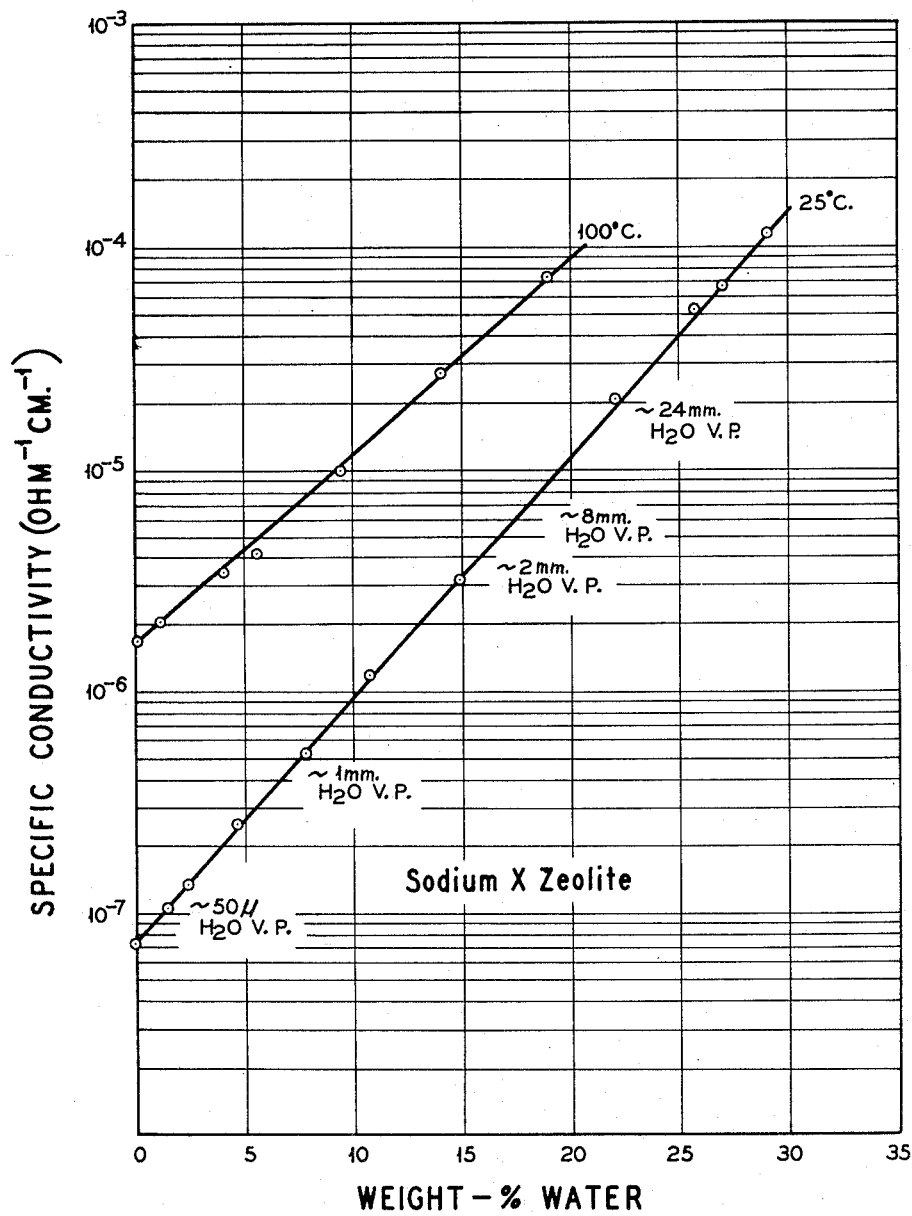

It has now been found that the electrical conductivity of a crystalline zeolite is profoundly influenced by the amount of water contained in the zeolite. For example, FIG. 5 shows the electrical conductivity of a single compressed pellet of sodium X zeolite as a function of the weight percent of contained water. The conductivity is seen to be exponentially dependent on water content at several temperatures.

The zeolite pellet was prepared in the form of a cylinder ¼ inch long by ¼ inch in diameter, by vacuum hot pressing zeolite powder at 150° C. and 60,000 p.s.i. Gold foil electrodes were pressed onto the ends of the zeolite cylinder during the compacting operation. The conductivity was measured with an A.C. Wheatstone bridge at 1000 cycles per second. The water loading was measured by weighing an identical pellet in the same system by means of a helical quartz spring balance. The balance and the conductivity cell were so arranged in the system that they were at equal temperatures and under equal water vapor pressures at all times.

Figure 6:
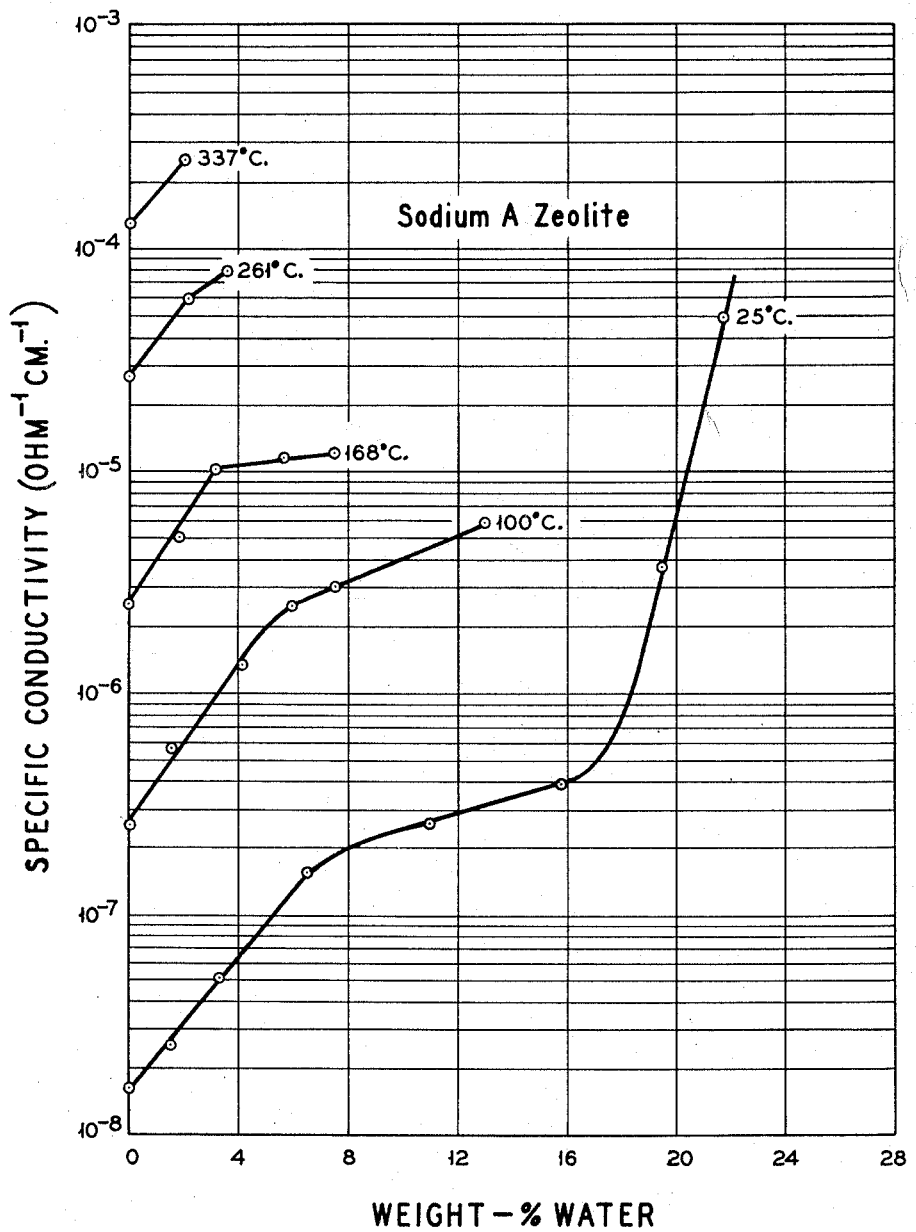

The data represented by the graph of FIG. 5 demonstrate the utility of a crystalline zeolite compact as a sensing element for moisture. It is apparent that sodium X zeolite is particularly desirable because the log conductivity is strictly linear with water content. This linear relationship does not occur with all zeolites. For example, the corresponding curves for sodium A zeolite are shown in FIG. 6. It is apparent that the linear relationship between log conductivity and water content found for sodium X zeolite is not maintained for sodium A zeolite. However, the utility of sodium A zeolite compacts for moisture sensing elements is not seriously impaired because the range of use may be restricted to those linear positions of the curve, or the non-linearity can be compensated for by an empirical calibration.

It is apparent from the data of FIGS. 3–7 that crystalline zeolite compacts are potential sensing elements for moisture throughout the whole range of water vapor pressures, from less than $50\mu$ to the saturation pressure.

Zeolite A is described and claimed in U.S. Patent No. 2,882,243 patented April 14, 1959.

Zeolite X is described and claimed in U.S. Patent 2,882,244 patented April 14, 1959.

To realize maximum utility as a moisture sensing element, it must respond rapidly to changes in the surrounding water vapor pressure. For the ¼-inch-diameter by ¼-inch-long crystalline zeolite pellets used in obtaining the data of FIGURES 5 and 6, the response time at high water vapor pressures was measurable in seconds; the response time at extremely low water vapor pressures was measurable in hours. A faster response may be achieved by reducing the volume of zeolite to a minimum, and by increasing the exposed surface of the zeolite to a maximum. This has been found to give satisfactory results.

Crystalline zeolites are ionic electrical conductors. The resistance of such materials shows an exponential dependence on temperature. The change in resistance due to temperature can be compensated for by employing an identical element hermetically sealed, by use of any of the temperature-controlling methods commonly employed with electronic measuring devices or by actual calibration over a range of temperatures.

The conductivity of zeolite compacts is more affected by polar than by non-polar adsorbates. Thus water, ammonia and acetonitrile shows a strong influence on the conductivity of sodium zeolite X molecular sieve. Normal atmospheric constituents, other than water, however, show no appreciable effect on the zeolite conductivity. Non-polar materials will affect the conductivity only slightly, but their effect on the water loading of the zeolite must be considered. In any case, proper calibration, if the concentration of the interfering material is known, can overcome this difficulty. For example, the rapid determination of the water content of organic liquids such as ethanol or hexane is feasible provided that the sensing element is calibrated with a series of samples of known water content and the medium is not otherwise contaminated. In these cases, alternatively, the sensing element can consist of a zeolite which is of such a pore size that it will not absorb the organic liquid e.g. potassium exchanged zeolite A does not absorb ethanol and sodium zeolite A does not adsorb hetane.

Being ionic conductors, crystalline zeolite moisture sensing elements are subject to polarization by direct current. The rate of polarization has been shown to be slow, however, so that a pulsed direct current resistance measuring circuit is feasible. Difficulties with polarization are best overcome by using an A.C. measuring circuit in the conventional manner disclosed herein.

Since crystalline zeolites are well known per se, it is not believed that a detailed description of the structure and chemical and physical behavior is necessary since such description is available in a great many publications on the subject.

Natural and synthetic zeolites are metal-alumino-silicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolites consist basically of a three-dimensional framework of $SiO_4$ and $AlO_4$ tetrahedra. The tetrahedra are crosslinked by the sharing of oxygen atoms. The electro-valence of the tetrahedra containing aluminum is balanced by the inclusion in the crystal of a cation, for example metal ions, ammonium ions, amine, complexes, or hydrogen ions. The spaces between the tetrahedra may be occupied by water or other adsorbate molecules.

The A.C. impedance of typical zeolite compacts is low enough so as to offer no problems in measurement. The impedance of a moisture sensing element can be caused to fall within a given range by choosing the proper electrode separation or area.

FIG. 1 shows a schematic diagram of a preferred embodiment of the invention which comprises an A.C. Wheatstone bridge having a crystalline zeolitic molecular sieve moisture sensing element 10 located in one leg thereof. Resistance 22 comprises another leg and the remaining two legs are formed by the precision potentiometer 24 having movable contact 26 for balancing the bridge circuit. Galvanometer 20 is placed across two of the diagonals of the bridge 30 and 32 and an A.C. voltage source 28 of preferable 1000 c.p.s. is placed across the other two diagonals 34 and 26 although the placement of these two elements could be reversed without affecting the operation of the circuit. The actual theory of operation of a Wheatstone bridge is thought to be sufficiently well known that it is not necessary to describe same in detail here. For further detailed description reference is made to the "Standard Handbook for Electrical Engineers" ninth edition, McGraw-Hill Book Co., pages 34 and 135. With such a bridge circuit the resistance of the moisture sensing element 10 may be determined when the values of precision resistors 22 and 24 and the setting of tap 26 are known. In operation the potentiometer tap 26 is manipulated until there is no current flow through the galvanometer or the voltages at points 30 and 32 are equal. At this point the resistance of the moisture sensing element 10 may be readily determined by relatively simple calculations.

While an A.C. Wheatstone bridge has been shown in the preferred embodiment for measuring the resistance of the moisture sensing element, it is to be understood that any accurate resistance measuring system could be used with equivalent results. The Wheatstone bridge was chosen for its simplicity and accuracy.

Figure 2:
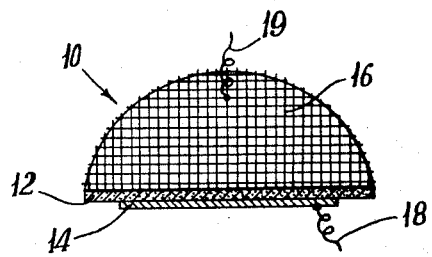
FIG. 2 is a view partly in cross section of a preferred form of a crystalline zeolite molecular sieve moisture sensing element.

FIG. 2 shows a preferred embodiment of a crystalline zeolitic molecular sieve moisture sensing element 10. The compressed zeolite disk 12 has a metal foil electrode 14 on one side thereof and a metal gauze electrode 16 on the other side with leads 18 and 19 soldered thereto. The use of the gauze electrode on at least one side of the disk 10 exposes a greater surface of the zeolite to the ambient thus increasing the surface zeolite to volume ratio and shortening the time required for the zeolite to reach adsorption equilibrium. This embodiment is one possible means of achieving such a high surface to volume ratio. There are other obvious means of accomplishing this; for example, a thin layer of zeolite could be bonded to a plastic (e.g. Bakelite) backing with electrodes at either end of the strip.

In forming zeolite compacts suitable for use as moisture sensing elements, it is essential that the zeolite be compressed to a degree sufficient to provide good electrical contact between the particles. Too high a pressure, however, will result in destruction of the zeolite, and also a loss in permeability to water vapor. The range of pressure is from 30,000 p.s.i. to 100,000 p.s.i. At the lower pressures the zeolite pellet is fragile; at the higher limit some decomposition occurs, therefore 50,000–60,000 p.s.i. is the preferred range. The temperature of compaction is not critical if under 200° C. About 150° C. has been found to be convenient. The zeolite should preferably, but not necessarily, be partially hydrated before compaction. If anhydrous zeolite is compacted the resulting pellet tends to be fragile. When pressed under the above preferred conditions in tungsten carbide dies, zeolite compacts are hard, coherent, permeable to water vapor, and offer no handling problems.

The following example specifically demonstrates the utility of a zeolite moisture sensing element for the measurement of ambient relative humidity:

About 0.25 g. of hydrated sodium X zeolite powder was evenly distributed over a disc of zinc foil in the bottom of a cylindrical hole ½ inch in diameter in a tungsten carbide die. The zeolite was pressed against the zinc by means of a hydraulic piston which forced a tungsten carbide plunger into the die. A pressure of about 30,000 p.s.i. at room temperature was used for this preliminary operation. The tungsten carbide plunger was then removed and a ½ inch disc of silver gauze placed over the layer of zeolite. The plunger was then replaced and a pressure of 50,000 p.s.i. was applied. While maintaining the pressure, the space surrounding the die was evacuated and the die assembly heated to 150° C. After a few minutes at temperature the pressure was slowly released and the assembly allowed to cool down. The thin disc of zeolite having zinc foil on one side and silver gauze on the other was removed and fine copper wires soldered to each of the two contacts. The zeolite moisture sensing element was tested for electrical shorts and labeled.

Figure 7:
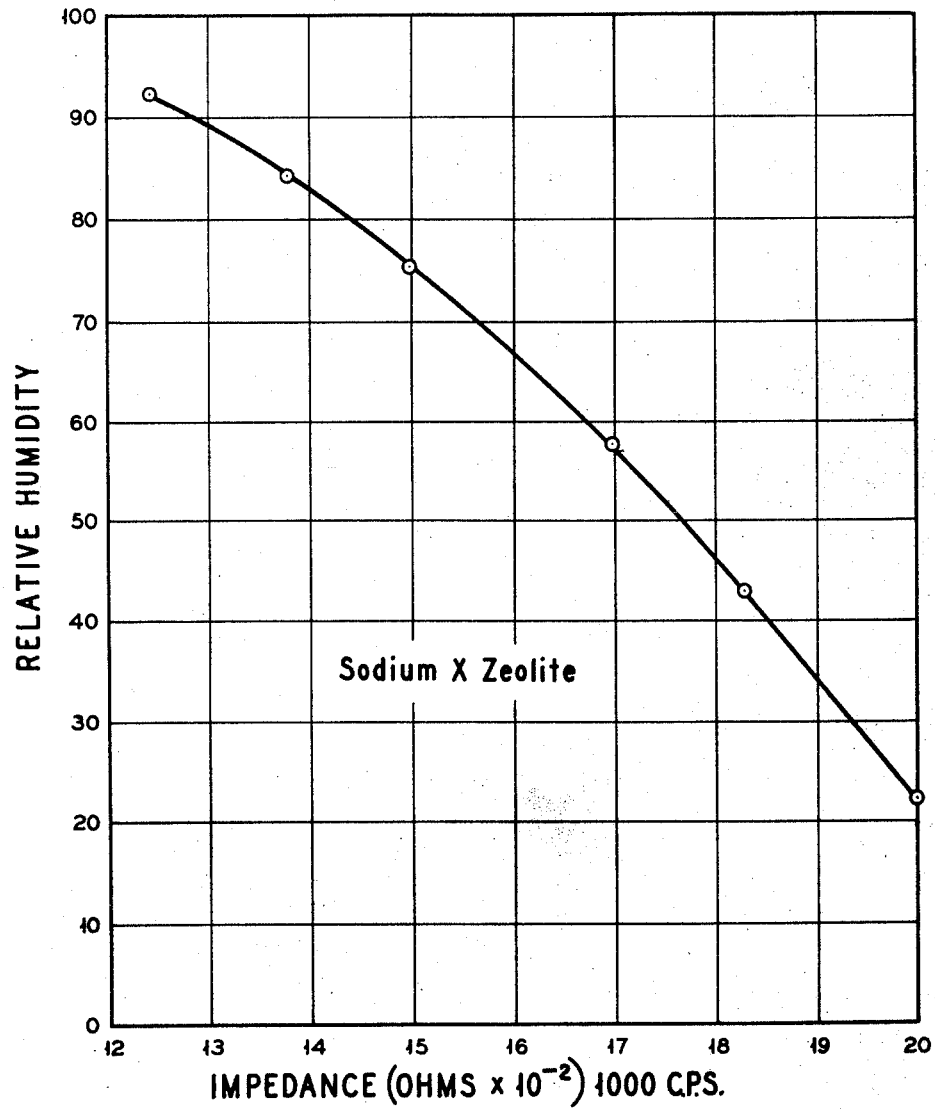

A series of tubes containing saturated salt solutions of known water vapor pressure was made up. The vapor pressure values at 25° C. were obtained from a suitable reference book. The tubes containing the standard saturated solutions were stoppered and allowed to equilibrate at room temperature for two days. The above moisture sensing element was introduced into each tube in succession by momentarily removing the stoppers. The impedance of the element under each of the known water vapor pressures was measured with an Electro-Measurements Model 250–DA impedance bridge at 1000 cycles per second. The sensing element was found to reach equilibrium in less than five minutes at each humidity level. The data are recorded in Table I and FIG. 7. The curve of FIG. 7 is not linear because the weight loading vs. relative humidity is not linear over the range studied. The curve, however, is smooth and constitutes a calibration curve for the particular element employed.

Table I

| Solid phase | Percent relative humidity (25° C.) | (Element impedance, ohms) |
|---|---|---|
| $K(C_2H_3O_2)1.5 H_2O$ | 22.5 | 2,000 |
| $K_2CO_3 \cdot 2 H_2O$ | 42.8 | 1,830 |
| $NaBr \cdot 2 H_2O$ | 57.7 | 1,700 |
| NaCl | 75.3 | 1,500 |
| KCl | 84.3 | 1,380 |
| $KNO_3$ | 92.5 | 1,240 |

It is to be understood that any crystalline zeolite that shows a dependence of conductivity on water content may be used. Preferred is sodium zeolite X molecular sieve because of its linear dependence of log conductivity on water content, its ease of compaction, its thermal stability, its availability, its low impedance, and its large pore size, which facilitates the attainment of equilibrium. However, any of the crystalline zeolite may be used for such moisture sensing elements whose electrical conductivity is dependent on moisture content. For obvious reasons those having a linear relationship between log conductivity and water content for all or part of their useful ranges will have advantages as far as calibration is concerned. Examples of the zeolite are zeolite A, zeolite Y, T, R, D, L, S, G and natural zeolites such as chabazite, erionite, faujasite, mortenite, analcite.

The following is a list of U.S. patent applications disclosing a number of synthetic crystalline zeolites which may be used to advantage in the instant invention.

Zeolite D is described and claimed in U.S. Patent application Serial No. 680,383 filed August 26, 1957.

Zeolite L is described and claimed in U.S. Patent application Serial No. 711,565 filed January 28, 1958.

Zeolite R is described and claimed in U.S. Patent application Serial No. 680,381 filed August 26, 1957.

Zeolite S is described and claimed in U.S. Patent application Serial No. 724,843 filed March 31, 1958.

Zeolite T is described and claimed in U.S. Patent application Serial No. 733,819 filed May 8, 1958.

Zeolite Y is described and claimed in U.S. Patent application Serial No. 728,057 filed April 14, 1958.

The preferred compositions of matter for the present invention which have been found to be most satisfactory and useful for catalytic purposes are the metal-loaded zeolites X, Y, and faujasite.

It is apparent that such zeolite moisture sensing elements can be used for the measurement of ambient relative humidity, the moisture content of gases and vapors, and the water content of organic liquids. Particularly valuable is the use of zeolite moisture sensing elements to indicate water breakthrough in a bed of molecular sieve adsorbents being used for drying purposes. Being of similar material to that in the bed, the sensing elements can be carried through the normal thermal activation cycles without damage and will respond in a manner practically identical to the individual pellets in the bed.

An example of this use would be in the gasoline upgrading process known as isomerization wherein the noble metal catalyst is usually activated by the presence of a Friedel-Crafts type metal halide compound. Such catalysts are subject to water damage through hydrolysis of the activator. The hydrolysis products also present metal-corrosion problems. The hydrocarbon feed stream to be isomerized can be effectively dried before contacting the catalyst by contact with a molecular sieve having a suitable pore opening to substantially exclude the normal paraffin and larger hydrocarbon molecules. Sodium zeolite A having a pore size of 4 A. is an example of a molecular sieve which may be employed in this process. Other molecular sieve zeolites having pore openings which are sufficiently large to freely admit all of the isomeric gasoline hydrocarbon compounds can also be used. Sodium zeolite X is one of the molecular sieves with this characteristic.

The hydrocarbon feed is dried by passing it either as a vapor or a liquid through a chamber containing a suitable molecular sieve zeolite. A crystalline zeolite moisture sensing element is located at or near the effluent end of the chamber where it is in contact with the dry hydrocarbon stream. During the process, a zone of water adsorption passes through the molecular sieve chamber. When this zone reaches the moisture sensing element the change in electrical conductivity of the element is detected by a suitable electrical measuring circuit. This is a convenient and reliable means of detection of the movement of the water adsorption zone. When the moisture sensing cell has detected the rise in moisture content of the hydrocarbon fluid near the effluent end of the chamber, the flow is stopped and the molecular sieve is then reactivated. Reactivation may be accomplished by heating to about 350° C. with a flow of an inert gas through the adsorbent bed. The process of the water removal from the adsorbent can be detected by the return of the conductivity of the moisture sensing cell to its original value.

There has thus been disclosed and described a novel moisture sensing element constructed from crystalline zeolites and a method for producing same. Said elements have the advantages of extreme simplicity and stability under a wide variety of conditions; they exhibit fast response time i.e. time to reach adsorption equilibrium, they are useful over an extreme range of vapor pressures, and are not subject to thermal damage up to 450° C.

While the invention has been described with reference to certain preferred embodiments, it is to be understood that modifications and changes could be made by a person skilled in the art without departing from the spirit and scope of the invention.

What is claimed is:

1. A method for measuring the water content of a fluid system which comprises immersing a sensing element formed of a crystalline zeolite material in the fluid system, and measuring the electrical resistance of said sensing element after the moisture content of the sensing element and of the fluid system are in adsorption equilibrium.

2. A method as set forth in claim 1 above wherein the electrical resistance is measured by applying an electrical potential across the sensing element and measuring the resultant current therethrough as an indication of the water content of the system.

3. A moisture sensing element for use in an electric hygrometer which comprises a pellet of crystalline zeolitic material whose volume resistivity is proportional to water content, having two electrodes in current carrying relationship therewith to facilitate the measurement of the electrical resistance thereof.

4. The moisture sensing element set forth in claim 3 wherein the crystalline zeolite is sodium X zeolite.

5. The moisture sensing element which comprises a thin flat disk of crystalline zeolitic molecular sieve material whose volume resistance is proportional to water content, said disk having two electrodes affixed in current carrying relationship with the opposite flat surfaces thereof, at least one of said electrodes being of a perforate character.

6. A moisture sensing element as set forth in claim 5 wherein said perforate electrode is metal gauze.

7. A moisture sensing element as set forth in claim 5 wherein the crystalline zeolitic molecular sieve material is sodium X zeolite.

8. An electric hygrometer which comprises a crystalline zeolite moisture sensing element having two electrodes in current carrying relationship therewith and a surface thereon adapted for exposure to a moisture containing medium, and an impedance measuring means connected to the electrodes for measuring the resistance of the element.

9. The electric hygrometer set forth in claim 8 wherein the impedance measuring means comprises an alternating current Wheatstone bridge and the moisture sensing element is inserted as the unknown impedance in one of the legs thereof.

References Cited by the Examiner

UNITED STATES PATENTS

| | | | |
|---|---|---|---|
| 2,047,638 | 7/36 | Kott | 73—336.5 |
| 2,684,592 | 7/54 | Hadady | 73—336.5 |
| 2,715,667 | 8/55 | Auwarter | 338—35 |
| 2,882,244 | 4/59 | Milton | 252—455 |

ISAAC LISANN, *Primary Examiner.*